Dec. 24, 1946.  R. M. BOWMAN  2,413,166
LETTER SCALE
Filed Feb. 12, 1945
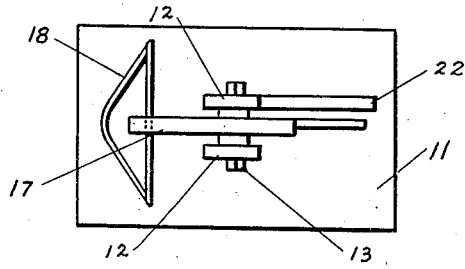
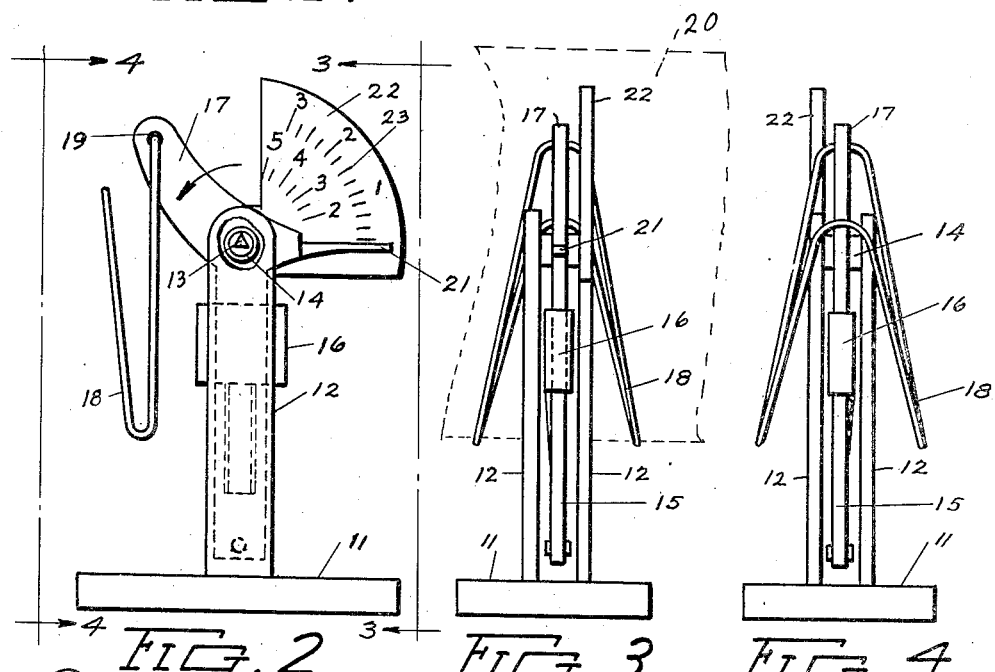
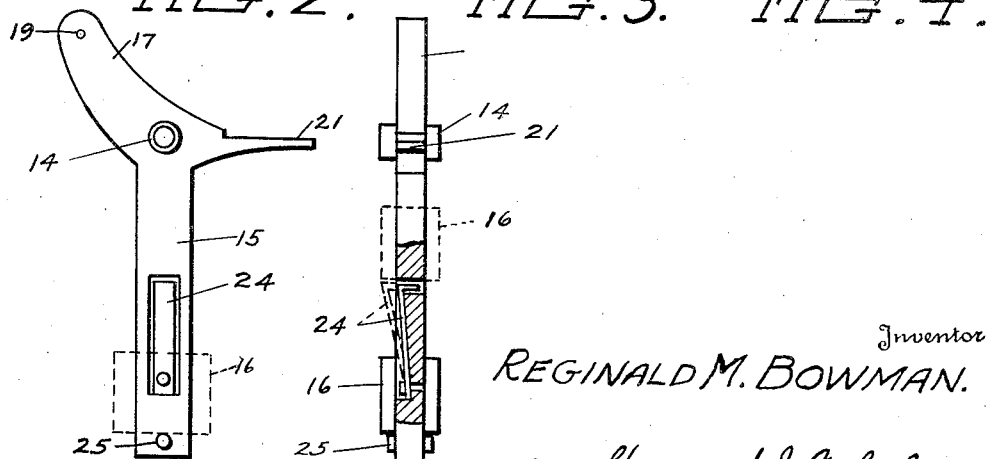
Inventor
REGINALD M. BOWMAN.
By Howard J. Whelan
Attorney Patented Dec. 24, 1946

2,413,166

UNITED STATES PATENT OFFICE 2,413,166

LETTER SCALE

Reginald M. Bowman, Baltimore, Md.

Application February 12, 1945, Serial No. 577,431

3 Claims. (Cl. 265—61)

This invention refers to scales and more particularly to postal scales. It has among its objects to provide a relatively small device that can be manufactured economically and do the work required of it effectively. Another object is to have the scales adaptable for varied weighing. A further object is to have the scales portable and so it can be conveniently handled and have its indicating arrangement included in a very clear and readable manner.

A still further object is to provide an improved postal scale.

Other objects will become apparent as the invention is more fully set forth.

Many types of postal scales have been provided and all follow principles that are generally similar. Some employ springs as the counter-resistance, which this invention avoids; while others use counter-weights generally placed in a horizontal position to counterpoise the weight of the matter to be mailed. In this invention the device employs means for weighing the matter to be mailed using a light holder mounted on a projecting arm supported on the column of a stand and having an indicator positioned to travel across a scale plate, the means for counterpoising the weight of the mailing matter being in the form of an adjustable weight set vertically and parallel with the column when in neutral setting.

In the drawing which illustrates an embodiment of this invention:

Figure 1 is a plan view of a postal scales embodying this invention;

Figure 2 is a side elevation of Figure 1;

Figure 3 is an end elevation of Figure 2, looking in the direction of arrows 3—3;

Figure 4 is an end elevation of Figure 2 opposite to that of Figure 3 and looking in direction of arrows 4—4;

Figure 5 is a detail side elevation of the weighted suspension member used in the scales; and Figure 6 is an end elevation of Figure 5, partly in section to indicate the structure of the catch employed for controlling the position of the weight used in the device.

Similar reference characters refer to similar parts throughout the drawing.

In the structure of the device shown in the drawing, 11 represents the base of a stand used to hold it in position on a table or the like. The base has a bifurcated column 12 mounted on it with a bearing member 13 provided in its upper portion for supporting the shaft 14 of a suspension member 15 having a weight 16 to keep it in a vertical position under normal conditions. The suspension member has a curved arm 17 extended from the side to support a wire bracket 18 through the use of a transversely arranged hole 19 provided therefor. The arm 17 is positioned at an angle to keep it relatively close to the column 12 yet far enough to prevent the envelope or letter matter 20 from rubbing or contacting it. An indicator needle 21 extends horizontally out from the suspension member on the side opposite to the arm 17. A scale plate 22 preferably of segmental form as indicated, is mounted on the column 12 in such a way as to allow the needle 21 to travel across its face and stop at whatever index 23 the equilibrium of the scales brings it to. There are two rows of indices 23. The outer row being used for lighter weighing, and the second and inner row being employed when heavier items are to be weighed. The weight 16 is held in its higher position or closer to the axis at 13 on which it rotates for lighter weighing, when the spring catch 24 on the member 12 extends out and under it. This is shown in the dotted outline in Figure 6. The weight 16 drops to the lower position at the bottom of the suspension member when the catch is pushed in sufficiently to allow this to happen. The weight is stopped by suitable lugs 25 in the lower position.

In operating the device, the user places the envelopes or other mailable material in the basket 18. The weight of the same lowers the basket and pulls down the arm 17 and rotates the member 15 in the direction of the arrow. This raises the weight 16 with it until the position of the indicator needle 21 shows the weight of the mailable article in the basket. When this article is removed the suspension member, its arm 17 and the needle 21 all return to the normal position from which they were moved in weighing the article. If the weight is arranged for the lighter weighing, it is placed in the position indicated in Figures 2, 3, and 4. For the heavier weighing the weight 16 is lowered to the position indicated in Figure 6 by depressing the catch 24 in the manner already described. The basket swivels on the arm and adjusts itself as the envelope is placed therein to bring the center of gravity under the hole 19. The curved arm enables the basket with its contents to be kept always in a vertical position and close to the column 12. It is located so that the indicator plate will not be interfered with, and the indications on the latter are where they can be readily and conveniently read by the user. The arrangement is made compact, which facilitates the readings, makes the balance of the device more stable and enables it to be manipulated more conveniently.

While but one general form of the invention is shown in the drawing and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. A postal scales of the class described comprising in combination, support means, a vertical suspension member pivotally mounted on said means and adapted to rotate thereon from a vertical position to one side thereof, said member having an angular and curved arm near the upper portion thereof and an indicating needle laterally disposed on the opposite side of the pivotal axis and movable in coordination with the arm, a basket for articles to be weighed mounted on the arm and disposed adjacent to said support means so that the center of gravity of the basket and articles will be under the point of attachment of the basket to the arm, and means mounted on the first mentioned means for indicating the weight from the position of the needle adjacent thereto.

2. A postal scales of the class described comprising in combination, support means, a vertical suspension member pivotally mounted on said means and adapted to rotate thereon from a vertical position to one side thereof, said member having an angular and curved arm near the upper portion thereof and an indicating needle laterally disposed on the opposite side of the pivotal axis and movable in coordination with the arm, a basket for articles to be weighed mounted on the arm and disposed adjacent to said support means so that the center of gravity of the basket and articles will be under the point of attachment of the basket to the arm, means mounted on the first mentioned means for indicating the weight from the position of the needle adjacent thereto, and vertically adjustable weight means attached to the said member in vertical relation thereto for adjustably weighting the same and controlling the indicating effect of the needle.

3. A postal scales comprising a vertical support, a vertical suspension member pivotally mounted on the support and adapted to swing from a vertical to a sidewise position, an arm on the member angularly attached to the member and supporting an article holding means therefrom, an indicator plate mounted on the support and aligned with the said member so the movement thereof will be shown on the plate, and vertically adjustable weight means mounted on the said member for controlling the balance of the same and of articles placed in the holding means.

REGINALD M. BOWMAN.